(12) United States Patent
Andersson et al.

(10) Patent No.: US 6,178,168 B1
(45) Date of Patent: Jan. 23, 2001

(54) METHOD OF CONTROLLING CONNECTIONS IN A TELECOMMUNICATION SYSTEM

(75) Inventors: Staffan Andersson, Enskede; Torgny Anders Lindberg, Tullinge; Erik Lennart Bogren, Älvsjö; Lars Novak, Lund, all of (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/956,013

(22) Filed: Oct. 22, 1997

Related U.S. Application Data

(63) Continuation of application No. PCT/SE96/00532, filed on Apr. 23, 1996.

(30) Foreign Application Priority Data

Apr. 24, 1995 (SE) .................................... 9501494

(51) Int. Cl.$^7$ .......................... H04L 12/50; H01H 67/00; H04M 5/00
(52) U.S. Cl. ...................... 370/360; 340/825.03; 379/268
(58) Field of Search ................................... 370/381, 353, 370/357, 360, 384, 420; 340/825.79, 825.03, 825.34, 827; 714/800, 821; 379/268, 207, 201

(56) References Cited

U.S. PATENT DOCUMENTS

| | | | |
|---|---|---|---|
| 3,787,635 | 1/1974 | Kammerl et al. | 340/825.07 |
| 4,821,256 | 4/1989 | Schmidt et al. | 370/360 |
| 5,046,183 | 9/1991 | Dorst et al. | 370/264 |
| 5,051,982 | 9/1991 | Brown et al. | 370/381 |
| 5,065,392 | * 11/1991 | Sibbitt et al. | 370/360 |
| 5,065,393 | * 11/1991 | Sibbitt et al. | 340/825.03 |
| 5,107,489 | 4/1992 | Brown et al. | 340/825.79 |
| 5,115,425 | 5/1992 | Ardon | 370/357 |
| 5,353,343 | 10/1994 | Hymel | 379/268 |
| 5,596,572 | * 1/1997 | Wille-Fier et al. | 370/360 |
| 5,600,640 | * 2/1997 | Blair et al. | 370/360 |
| 5,663,947 | * 9/1997 | Wille-Fier et al. | 370/360 |

FOREIGN PATENT DOCUMENTS

| | | |
|---|---|---|
| 37 03 723 | 8/1988 | (DE) . |
| 38 18 087 | 12/1989 | (DE) . |

\* cited by examiner

*Primary Examiner*—Alpus H. Hsu
*Assistant Examiner*—Afsar M. Qureshi
(74) *Attorney, Agent, or Firm*—Burns, Doane, Swecker & Mathis, L.L.P.

(57) ABSTRACT

User terminals are connected to a telecommunication system. The telecommunication system includes a control system for the control, such as set-up, release and modification, of connections between the user terminals. A large portion of functions are common for control of dynamical as well as semi-permanent connections. Control of a connection can be initiated from any of the user terminals to which the connection relates, or from other user terminals. Control data for the connections can be stored in different types of storage resources in the control system, the different types of storage resources having different degrees of reliability.

19 Claims, 6 Drawing Sheets

METHOD OF CONTROLLING CONNECTIONS IN A TELECOMMUNICATION SYSTEM

This application is a continuation of International Application No. PCT/SE96/00532, filed Apr. 23, 1996, which designated the United States.

BACKGROUND

The present invention relates to a method of controlling connections in a telecommunication system to which user terminals are connected. The telecommunication system comprises a control system for connection control, such as set up, release and modification of connections between user terminals. The control system comprises control resources as well as storage resources. The storage resources store control data related to said connections.

In particular the invention relates to a method of the indicated kind in a system that handles dynamic connections as well as semi-permanent connections.

U.S. Pat. No. 5,107,489 discloses a switch with an associated protocol for set up of dynamical connections by using frames. Each frame comprises an identifier identifying the source and the destination of the frame as well as link control information for maintenance, establishment and release of a connection between source and destination.

U.S. Pat. No. 5,115,425 discloses a distributed switch system comprising switch modules in a network. A call is handled in one of two modes. In a first mode unoccupied or free connections through the switch are selected quite regardless of if they are already established or not. In a second mode connections which are already established are selected.

U.S. Pat. No. 5,051,982 discloses a method and a system for fast set-up of circuit switched virtual connections in a digital circuit switched switch that integrates speech and data by using a common switch, a common control system and a common distribution system. Non-used bandwidth can be retrieved and dynamical connections can be so re-arranged that bandwidth utilization is optimized, thus providing for a maximum data speed at any time.

U.S. Pat. No. 4,821,256 relates to a method or monitoring information transmission in semi-permanent established 4-wire connections in digital time multiplex switches. Monitoring takes place by comparing bit streams and parity tests.

U.S. Pat. No. 5,046,183 relates to an arrangement so designed that when there is a call that should be debited the receiver or a third party, or when there is a personal call, an operator needs to be involved only after the call has been set up; the type of the call being displayed to the operator so as to assist the operator.

DE 38 18 087 relates to a telephone conference system comprising a permanent memory storing data relating to a number of participants which are to join a telephone conference. From one conference participant telephone conference connections can be set up to other conference participants.

A telecommunication system of the kind referred to above provides telecommunication services for which different types of connections between the user terminals can be controlled, such as for example be set up, be released and be modified.

For a first connection type said control is initiated from a user's terminal, for example a telephone or a computer. A user can initiate said control without involving an operator. The number of connections of this first type usually varies strongly over the time as does the respective durations of the connections; said durations often being short, for example some minutes or hours. Accordingly, connections of this type are very flexible. Such connections will in the following therefore be referred to as dynamical connections. An advantage of a dynamic connection is the swiftness by which it can be controlled and the simple way in which the control takes place.

For a second connection type said control is initiated by an operator of an operation and support terminal in an operation and support system. Connections of the second type usually are of a long duration, for example in the order of months. Compared with dynamical connections they are more static by nature. In the following, connections of the second type will be referred to as semi-permanent connections. An advantage of a semi-permanent connection is that it is less sensitive to disturbances, such as for example a non-desired release of the connection, than is a dynamic connection. This ability of not disturbing a connection is referred to as robustness.

The robustness of semi-permanent connections is better than that of dynamical connections and is provided by storing control data related to semi-permanent connections more reliably than control data related to dynamical connections. Said more reliable storage of control data is in the following referred to as persistent storage.

To control dynamical connections a first set of functions is used in the telecommunication system. To store semi-permanent connections a second set of functions is used. A majority of the functions of said second set are resident in a separate operation support system and are thus to a great extent separated from said first set of functions.

By using functions from said first set of functions, the control of dynamical connections can be initiated from a user's terminal, for example a telephone or a computer. Functions from said second set of functions are used to control connections of high robustness and said control is initiated from said operation support system. A problem associated with the control of semi-permanent connections from within an operation support system is that it takes a long time for a user until a robust connection is set up. This is so because the user must first inform the operator of the telecommunication system and then the operator must set up the connection. This is a process that takes a long time, perhaps several days.

The telecommunication system comprises several switching nodes interconnected in a network. The robustness of a dynamic connection that passes through several such switching nodes is low. In accordance with prior art technique the robustness of dynamical connections is increased for example by using more reliable hardware such as processors and switches which entails additional costs. The additional costs present a problem.

Dynamical connections make use of control resources such as processing capacity of a processor included in the control system, and volatile data storage resources such as RAM memories. The amount of control resources and data storage resources as used is proportional to the number of dynamical connections that have been set up. The supply of resources is scarce and will limit the number of dynamical connections that can be set up. This presents a problem.

SUMMARY

The object of the present invention is to reduce the above mentioned problems relating to the telecommunication system. User terminals are connectable to the telecommunication system. The telecommunication system comprises a control system for control, such as set up, release and modification, of connections between said user terminals. The control system comprises control resources as well as storage resources. The storage resources store control data related to connections in the telecommunication system.

In particular, one object of the present invention is to combine the advantages of dynamical connections with the advantages of semi-permanent connections in a simple manner such that:

(a) control of semi-permanent connections can be initiated from a user terminal,
(b) the robustness of dynamical connections is possible to select such that it will be equal to that of semi-permanent connections, i.e. it is possible to modify robustness,
(c) the capacity of a control system is increased, given a shortage of resources, such as processing capacity; or in other words given a predefined capacity the need of resources car be reduced.

The above objects are achieved by the features indicated in the appending claims.

The invention will provide a connection, irrespective of its type, with several of the good properties which in accordance with previously known technique are inherent either in dynamical connections or in semi-permanent connections. The control of a robust connection is initiated from a user's terminal, without the traditional operation support system. Thus a user himself or an operator initiates this control. There is no longer any need for a specific operation support terminal or for an operation support system for handling semi-permanent connections.

Semi-permanent connections are controlled in generally the same manner as dynamical connections. In contrast to dynamical connections control data related to the semi-permanent connection will, however, be persistently stored so as to provide semi-permanent connections with a robustness that is higher than that of dynamical connections. Functions for control of dynamical connections are to a great extent re-used for the control of semi-permanent connections.

The robustness of a connection can be changed. A modification of the robustness of a connection is initiated either directly at a user's terminal or is initiated from within the control system in response to a user's behavior. In the latter case the control system stores connection related control data in the different storage media so as to attain a predetermined robustness mean value. A sufficiently good robustness will thereby be attained without making unnecessary use of scarce resources, thus making it possible to cut costs or to increase the capacity of the control system.

In U.S. Pat. No. 5,051,982 there is no disclosure of connections having different robustness. Connection control data are stored in one type of storage resource only, namely in a RAM.

BRIEF DESCRIPTION OF THE DRAWINGS

The invention will be described in detail with reference to the accompanying drawings wherein, FIG. 1 schematically illustrates a telecommunication system in which the invention is used, FIG. 2 schematically illustrates a telecommunication system and an operation support system connected thereto, said telecommunication system comprising several nodes, FIG. 3 schematically illustrates a control system, comprising control functions and storage resources of the telecommunication system shown in FIGS. 1 or 2, FIG. 4 schematically illustrates a method in accordance with the invention, said method being used in the control system shown in FIG. 3.

DETAILED DESCRIPTION

Figure 1:
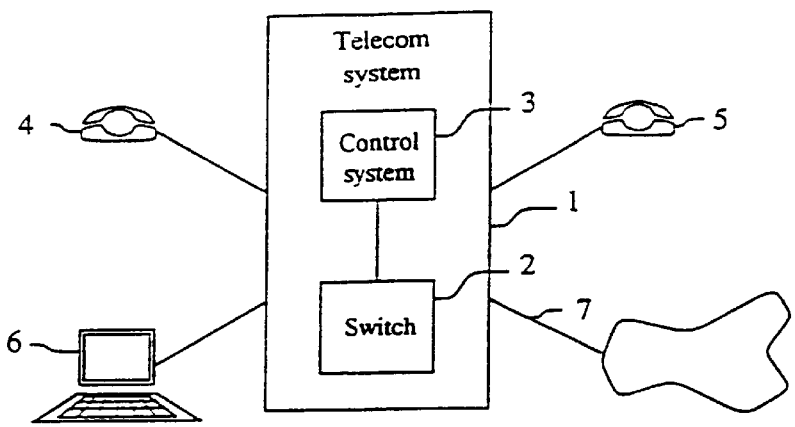

One embodiment of the invention as used in the control system of a telecommunication system 1 is schematically illustrated in FIG. 1. The telecommunication system 1 comprises a switch 2, for example a digital circuit connected time switch, and a control system 3. User terminals, such as telephones 4, 5 or computers 6, and external lines 7, such as for example trunks, are connected to the telecommunication system 1.

Figure 2:
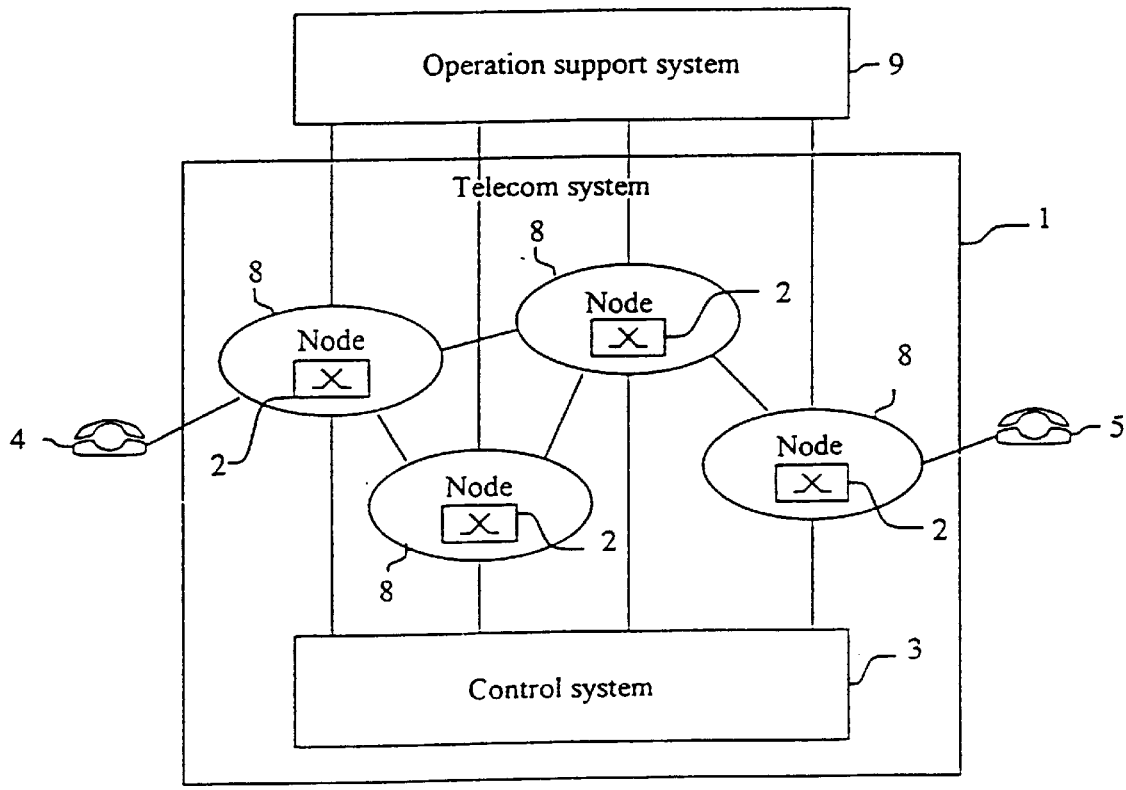

The telecommunication system in which the invention is used may, in a manner known per se, comprise a network having several interconnected nodes 8 as shown in FIG. 2. In FIG. 2 there is also shown an operation support system 9.

Connections between user terminals 4, 5 are controlled, for example set up, released or modified, by the control system which operates on switch 2 in FIG. 1 or on the switches 2 in FIG. 2.

Figure 3:
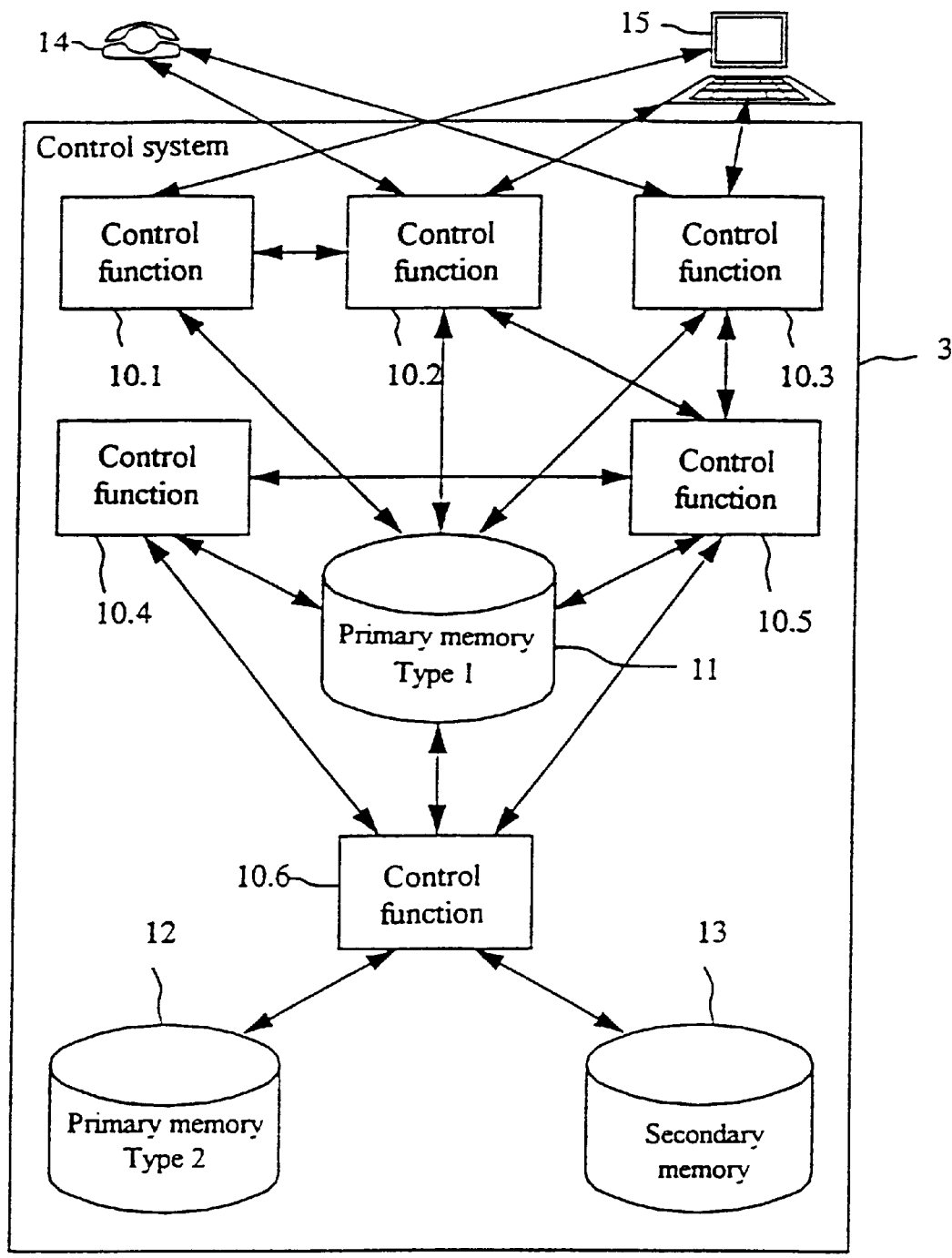

In FIG. 3 the control system is shown in detail. The control system comprises control functions 10.1–10.6 and storage resources. The storage resources comprise primary memories of a first type 11 and of a second type 12 as well as a secondary memory 13. The control functions may directly or indirectly seize the different storage resources. In accordance with the invention the major part of the control functions of the control system for connection control is directly or indirectly common to control of all types of connections. The connection types concerned comprise dynamic connections as well as semi-permanent connections. A telephone 14 and a computer 15 represent the different types of connections; the telephone representing a dynamic connection and the computer a semi-permanent connection.

The arrows shown in FIG. 3 symbolize interworking between user terminals 14, 15, control functions 10.1–10.6 and storage resources 11–13. For example the two user terminals interwork directly with control functions 10.2, 10.3 which they have in common as well as indirectly with several other control functions 10.4–10.6 and storage resources 11–13.

Control, such as set up, release and modification, of connections of the semi-permanent type is initiated by a user which invokes the common control functions. To this end the common control functions must allow for storage of connection related control data in storage resources that provide the connections with their appropriate properties. This will be discussed below.

The primary memory 11 of the first type has a relatively low degree of reliability while the primary memory 12 of the second type has a higher degree of reliability because it has, in a manner known per se, a hardware support for write protection. The secondary memory 13, which is a disc memory, has the highest degree of reliability.

Connections of the semi-permanent type shall usually have a high degree of robustness. Accordingly control data associated with such connections are stored in a primary memory of the second type and/or in the secondary memory thus providing the connections with their appropriate properties.

The primary memory of the second type and the secondary memory are available to the function 10.6 only in consequence of the above mentioned hardware support. Since said memories are available from the function 10.6 only, the reliability of these storage resources is increased. This constitutes one of several possible ways, known per se, which contribute to storage resources having high reliability.

For reasons of simplicity the invention will in the following be described in a system having two types of data storage resources only. Said types are referred to as volatile and persistent respectively. To a person skilled in the art it is apparent that more than two types of data storage resources are possible, each type providing a respective degree of reliability.

The control system also comprises control resources which can be seized by the control functions. Control resources comprise processing capacity of a processor, not shown. When connection related control data for a connection has been persistently stored, control resources will be released. The released control resources are now free and can be used by another connection.

Also volatile data storage resources will be released when control resources are released and such free storage resources can be used for another connection.

In accordance with an important feature of the present invention control data relating to connections of all types can be moved between the volatile and persistent data storage resources. Accordingly, control data can be moved from the volatile to the persistent data storage resources, and from the persistent to the volatile data storage resources. It is therefore possible to adapt the properties of a connection to meet desired requirements, and the utilization of the resources of the control system is optimized, given said properties. Optimum utilization implies that only such resources are seized which are necessary for achieving sufficiently good properties.

If control data are not stored in the persistent memory then, in the described embodiment, the volatile data storage resources will limit the number of simultaneous connections that can be handled by the telecommunication system. Further, the control resources will limit the extent to which control data can be moved between volatile data storage resources and persistent data storage resources. Movement of control data will namely require processing capacity. Accordingly, control data relating to highly flexible connections should therefore not be stored without restrictions in the persistent memory since, if done, this results in frequent and extensive movements of control data between the volatile data storage resources and the persistent data storage resources.

Figure 4:
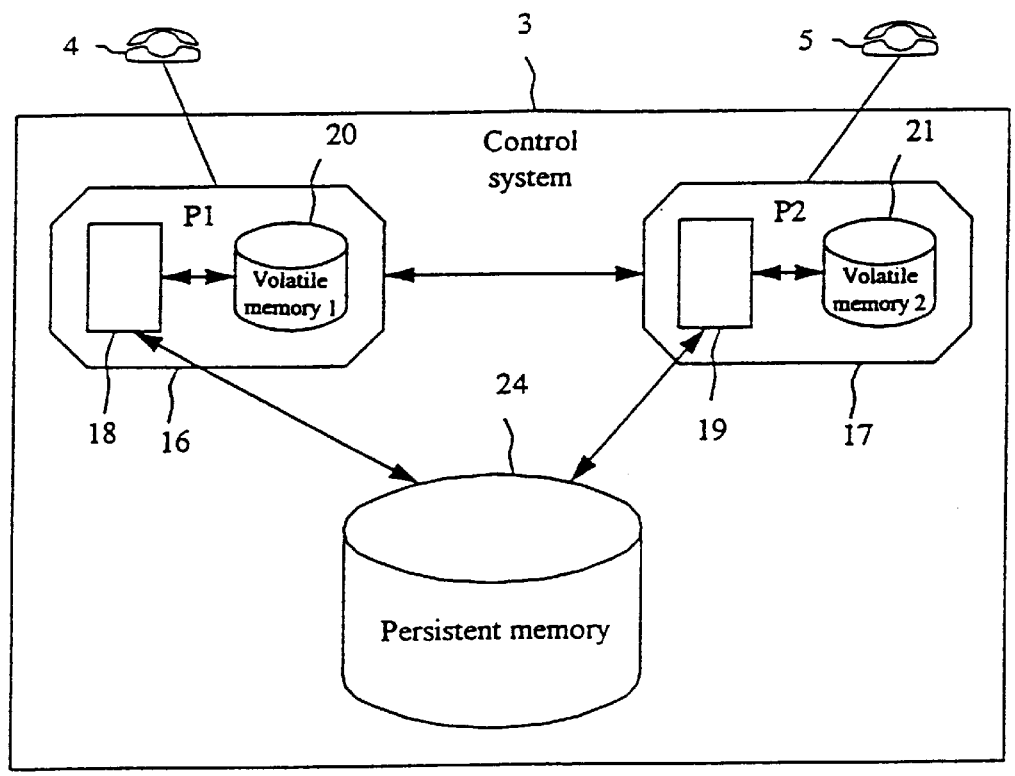
Figure 5:
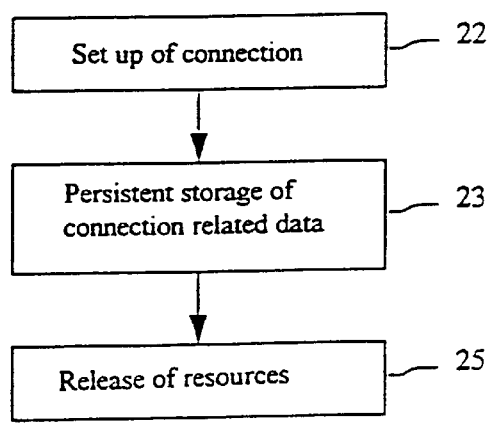
FIG. 5 illustrates an inventive method for setting up a semi-permanent connection from a user's terminal.

With reference to FIGS. 4 and 5 a first method in accordance with the invention will be described. The main features of the method are the following: A connection is initiated from a user's terminal, control data for the connection are stored in a persistent memory, thereby providing the connection with a high degree of robustness.

A user terminal 4 initiates the set up of a connection to a user terminal 5. The connection shall have the same robustness as is characteristic for a traditional semi-permanent connection. When the request for connection set up is made dynamical processes 16, 17 are created. Each process represents a respective control function. In the processes connection related control data are manipulated by procedures 18, 19 which are implemented in program logic. Connection related control data belonging to the respective processes are stored in a respective volatile memory 20 and 21. The processes are responsible for the set up of the connection, box 22 in FIG. 4, in a manner known per se. Following this connection related control data is copied, box 23, from the volatile memories 20, 21 to the persistent memory 24. Next volatile data storage resources are released, box 25, when the dynamical processes 16, 17 cease.

Figure 6:
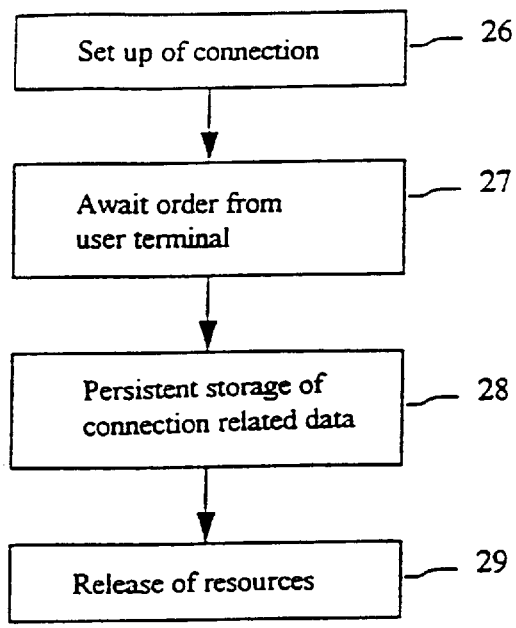
FIG. 6 illustrates an inventive method for changing the robustness of a connections, said method being initiated by a user.

A second method will now be described with reference to FIG. 6. This method will have the following main features: A connection is set up between two user terminals to begin with and after a period of time the robustness of the connection is modified on the initiative of any one of the user terminals. A connection having a robustness that is lower than the highest robustness is set up from a user's terminal, box 26. Thereafter a modification of the properties of the connection is requested from any one of the user terminals 4, 5. In particular it is requested that the robustness of the connection be increased.

Next there is a state of waiting for an order to be issued from any one of the user terminals, box 27. The connection related control data is copied from volatile memories to persistent memories, box 28. Thereafter the dynamical processes cease and control resources as well as volatile storage resources are released, box 29.

Figure 7:
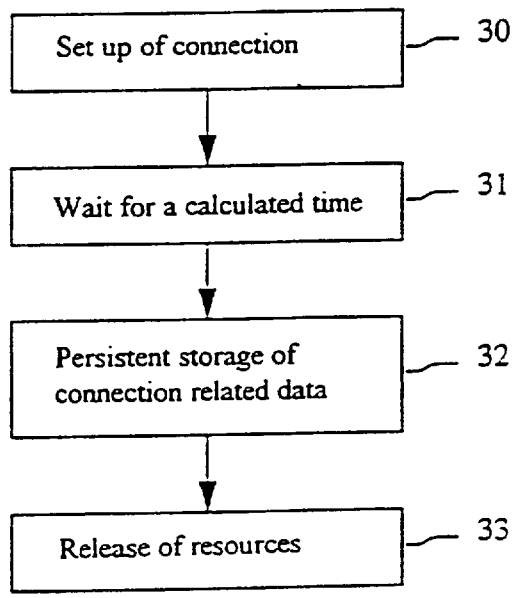
FIG. 7 illustrates an inventive method for changing the robustness of a connection after a predetermined time.

A third method will be described next in connection with FIG. 7. A robustness requirement sometimes means that a statistical mean value of disturbance probability relating to several connections may not be larger than a predetermined value. An inventive method to fulfil the above requirement is, during certain phases of the control of a connection, such as during the set-up phase, to store connection related control data for the connection in a volatile memory and to, during other phase, such as during data phase, store the connection related control data in a persistent memory. After a certain time, for example after 15 min. in data phase, said time being so calculated that a sufficiently high robustness has been attained, the connection related control data are stored in a persistent memory. When storing the data in the persistent memory it is probable that the connection is of a relatively static nature, and thus no extensive processing capacity is seized. Said time is calculated in advance, for example during system configuration, or is calculated during operation.

The method has the following main characteristic features: Set-up of a connection, box 30, wait for the calculated time, box 31, store of connection related data in a persistent memory, box 33 and, as a consequence, release resources, box 32.

Figure 8:
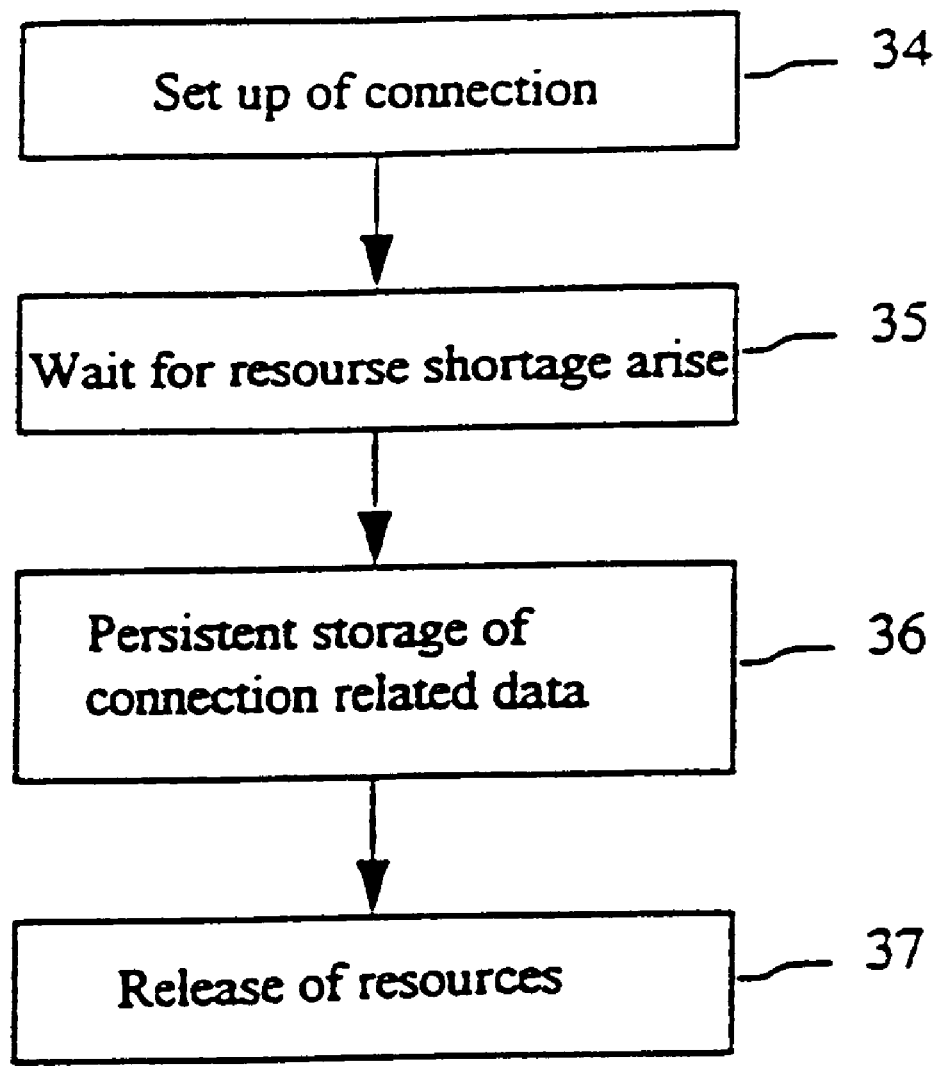
FIG. 8 illustrates an inventive method for changing the robustness of a connection under conditions of shortage of resources.

A fourth method will be described next in connection with FIG. 8. When the amount of resources as occupied by connections exceeds a predetermined limit, then a function in the control system selects those connections the control data of which are to be stored in another type of storage resource. When the storage of the connection related control data has been completed control resources as well as storage resources are released in a manner described above. Said function selects the connections according to different criteria, among these the duration of a connection and the type of connection. If a connection has lasted for more than for example 10 minutes there is a high probability that the connection will last for still a good time and therefore its connection related control data are stored in another type of storage resources so as to release resources which can be used for set-up of additional connections. In this case connections are selected based upon a user's behavior.

This fourth method has the following characteristic features: A number of connections are set-up, box 34, when resources shortage begins, box 35, control data relating to selected connections are stored in another type of storage resource, box 36, thus making the released resources available, box 37.

In order to maintain a stipulated minimum robustness for dynamical connections that pass through several switching nodes control data relating to said connections are stored persistently.

Figure 9:
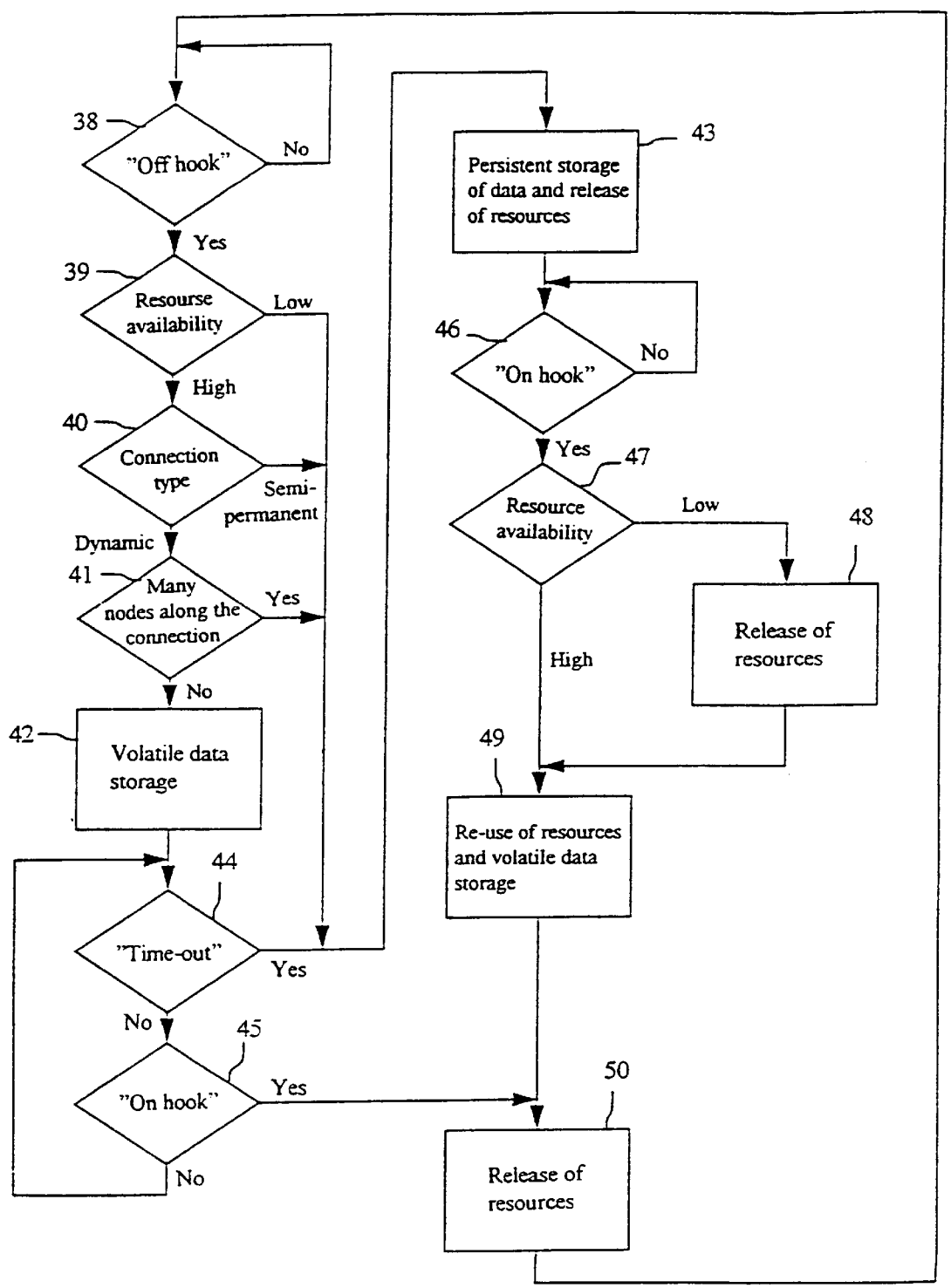
FIG. 9 illustrates a simplified flow diagram for handling of a connection.

In FIG. 9 a simplified block diagram for handling of a connection in accordance with invention is shown. The control system receives signals from the user terminals. A signal "off hook" indicates that a user terminal initiates set-up of a connection. Another signal, "type of connection", tells the control system if the connection shall be a semi-permanent or a dynamic connection. Still another signal "on hook" indicates that the connection shall be released.

Functions which are previously known per se and which measures the amount of resources available in the control system will: release processor capacity in a processor, release data storage resources, perform time measurements, count the number of nodes through which a connection passes, store connection related control data persistently and will move connection related control data from persistent storage to volatile storage. These functions will therefore not be described in detail. The flow diagram will be described next.

The control signal waits for the signal "off hook" at selection box 38. If the amount of available resources is high, selection box 39, if the connection is a dynamic connection, selection box 40, and if the connection passes through just one node, selection box 41, then the control data associated with the connection is stored in volatile memories, box 42. On the other hand if the amount of available resources is low, alternative, "low" at selection box 39, if the connection is a semi-permanent connection, selection box 40, or if the connection passes though several nodes, selection box 41, then the control data associated with the connection is stored persistently thus releasing processing capacity for the processor, i.e. thus releasing control resources as well as volatile memories, box 43. If a dynamic connection lasts for a certain predetermined time, selection box 44, for example 10 minutes, then the control data associated with the connection are stored persistently and processing capacity in the processor as well as volatile memories will be released, box 43. If the signal "on hook" is detected, selection box 45, then processing capacity as well as volatile memories will be released, box 50, and the control system will then wait for the signal "off hook", box 38. Following the storage of persistent data, box 43, the control system waits for a signal "on hook", box 46. If the amount of resources is low, alternative "low" at selection box 47, then, after reception the signal "on hook", selection box 46, resources belonging to other connections will be released, box 48. Control data relating to said connections will now be stored persistently and said connections will be selected based upon how long they have lasted. Resources which are released at box 48 will be sized and the control data is stored in volatile memory resources, box 49. At box 50 resources are released and the "on hook" signal, is awaited, selection box 38.

It is obvious to the man skilled in the art that the telecommunication system in which the invention is applied, in manner known per se may comprise a control system which physically is distributed over several nodes (distributed control system) for example over the nodes shown in FIG. 2.

What is claimed is:

1. A method of controlling connections in a telecommunication system to which user terminals are connected, the telecommunication system including a control system for controlling connections between the user terminals, the control system including control resources and storage resources for storing control data associated with the connections, the method comprising the steps of:
   using dynamical connection control functions for controlling semi-permanent connections, and
   initiating control of the semi-permanent connections from the user terminals in cooperation with the control functions,
   wherein the control functions include connection set-up, release, and modification functions, and control data relating to the connections are stored in different types of storage resources of the control system, the different types mutually having different degrees of reliability.

2. The method of claim 1, wherein robustness of a connection is changed by moving control data relating to the connection between the different types of storage resources, the storage resources having mutually different reliabilities so as to provide different degrees of robustness.

3. The method of claim 2, wherein the robustness of a connection initially is selected low, and after a certain time, is increased by storing the control data of the connection in a storage resource of a type that has low reliability and thereafter moving the control data to a storage resource of a type having a higher reliability.

4. The method of claim 3, wherein one type of a storage resource comprises a RAM-memory, another type of storage resource comprises a RAM-memory provided with hardware support for write protection, and a third type of storage resource comprises a disc memory.

5. The method of claim 1, wherein resources of the control system are released when connection related control data are stored persistently.

6. The method of claim 5, wherein resources are released when predetermined conditions are fulfilled.

7. The method of claim 6, wherein one of the conditions is high control system load.

8. The method of claim 6, wherein at least one of the conditions is associated with user behavior.

9. The method of claim 6, wherein at least one of the conditions is associated with the service used in a connection that has sized a resource.

10. A method of increasing a robustness of a dynamic connection in a telecommunication system having a control system that includes program controlled functions for controlling the dynamic connection, the method comprising the steps of:
    initially selecting a low robustness of the connection, and after a certain time, increasing the robustness by first storing control data relating to the connection in a storage resource of a type that has low reliability and thereafter moving the control data to a storage resource of a type that has a higher reliability.

11. The method of claim 10, wherein a storage resource of one type comprises a RAM memory, a storage resource of another type comprises a RAM memory having hardware support for write protection, and a third type of storage resource comprises a disk memory.

12. The method of claim 10, wherein the robustness of the dynamical connection is selected by storing control data relating to the connection in a storage resource of a type that provides the desired robustness.

13. The method of claim 12, wherein the robustness of a connection is changed by moving the control data of the connection between the different types of storage resources.

14. A method for increasing resources of a control system in a telecommunication system, the control system including program controlled functions for controlling connections between user terminals, the method comprising the steps of:
  initially storing connection data related to selected connections in a storage resource of a type that has low reliability, and
  thereafter moving the initially stored connection data to a storage resource of a type that has a higher reliability, thus releasing resources in the control system.

15. The method of claim 14, wherein the connections are selected in accordance with predetermined conditions.

16. The method of claim 15, wherein the connections include high control system load.

17. The method of claim 16, wherein at least one of the conditions is associated with a user's behavior.

18. The method of claim 14, wherein at least one of the conditions is associated with a service used in a connection that has sized a resource.

19. A device for controlling connections in a telecommunication system having user terminals, a control system having functions for controlling connections between user terminals and functions for storing control data, and storage resources including at least a volatile memory and at least a persistent memory, the device comprising a mechanism which is sensitive to instructions generated at at least one of the user terminals and at a terminal of an operator of the telecommunication system so as to move control data relating to a predefined connection from the volatile memory to the persistent memory.

* * * * *